Patented Jan. 14, 1930

1,743,630

UNITED STATES PATENT OFFICE

SAMUEL LEWIS SUMMERS, OF FORT WASHINGTON, PENNSYLVANIA

METHYLENE-DISALICYLIC ACID DERIVATIVE

No Drawing.  Application filed October 12, 1928. Serial No. 312,198.

My invention relates to organic compounds and their manufacture, and is especially concerned with a novel ethylate condensation product of the di(aminobenzyl) ethers of methylene-disalicylamide with pyruvic acid as hereinafter described. These substances are useful for pharmaceutical purposes as hereinafter indicated.

My new and useful products may be prepared as follows:—

Starting with methylene-disalicyclic acid, the first main step is esterification preferably by ethyl alcohol, though other alcohols may be used. As the alcohol is replaced in the next step the particular alcohol is of no consequence. The esterification may be accomplished as follows though I do not limit myself to this particular method:

Dissolve 288 lbs. of methylene-disalicylic acid in 150 lbs. of ethyl alcohol and slowly add to this solution, keeping the temperature below 75° C., 100 lbs. concentrated sulphuric acid. When all of the acid has been added, heat to 150° C. under a reflux condenser for two hours. The essential product is the diethyl ester of methylene-disalicylic acid:

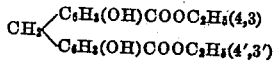

This is freed from sulphuric acid by washing with water.

The second main step is to convert this ester into the corresponding amide. One method of accomplishing this is as follows:

348 pounds of the above described ester is mixed with 200 pounds of strong aqueous ammonia ("concentrated," or 28%) and heated in an autoclave for 4 hours to a temperature of 110° C. The excess of ammonia, the water and the alcohol liberated during the reaction are gotten rid of, which leaves methylene-disalicylic amide, $$CH_2(C_6H_3(OH)CONH_2)_2$$

as the essential product. It is immaterial whether this is obtained through the ester as described or from methylene-disalicyclic acid by some other method.

The third main step is to substitute nitrobenzyl groups in the two hydroxyls of the above described methylene-disalicyl amide. One way of accomplishing this, to which I do not limit myself, is as follows:

286 pounds of methylene-disalicyl amide is intimately mixed with 345 pounds of p-nitrobenzyl chloride and 82 pounds of caustic soda and heated for 30 hours to 130° C. The essential product is the di(nitrobenzyl) ether of methylene-disalicyl amide:

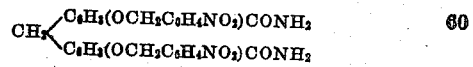

In the example given para nitrobenzyl chloride is specified but in its stead either of its isomers, the ortho or the meta, may be used. These give isomeric products closely resembling that obtained by the use of the para compound. The products all go through the subsequent reactions in the same way and give final products which for pharmaceutical uses are interchangeable.

The fourth main step is to reduce the two nitrobenzyl groups of the above described product to amino groups. This may be accomplished by the use of various reducing agents but one effective way of accomplishing it is to mix 556 pounds of the above described nitrobenzyl substitution product with 584 pounds of free metallic zinc, preferably in the form of dust, and 1,800 pounds of hydrochloric acid. After the heat of the spontaneous chemical reaction has subsided the mass is heated to 100° C., and maintained at that temperature for 8 hours. The mixture is made slightly alkaline by the addition of ammonia water which causes the separation of the desired amino derivative which is filtered off and washed with water to free it from the zinc chloride produced in the reduction. The product is dissolved in alcohol and freed from any zinc salts that may remain by saturating this solution with hydrogen sulphide. The alcohol is eliminated by evaporation which leaves the essential product, which is a di(aminobenzyl) ether of methylene-disalicyl-amide:

The fifth main step is to introduce pyruvyl groups (CH₃CO.CO—) into two of the four —NH groups of the above described compound. One way of accomplishing this, to which I do not limit myself, is to heat 496 pounds of the product with 200 pounds of pyruvic acid, previously dissolved in 100 pounds of alcohol, to 130° for 24 hours. The product is washed with water and dried. The essential product has the empirical formula $C_{35}H_{32}O_8N_4$, corresponding to the condensation of two molecules of pyruvic acid with one of the above described compounds; two molecules of water being eliminated.

The sixth and last main step is to ethylate the remaining —NH₂ groups. One way of accomplishing this, to which I do not limit myself, is by heating the purified product obtained as above described with 300 pounds of ethyl alcohol and 60 pounds of fused sodium acetate in an autoclave, heating to 100° C. for 8 hours. The reaction product is washed free of sodium acetate and dried. The essential product is the diamino-dipyruvyl derivative of the diaminobenzyl ether of methylene-disalicyl amide; having the empirical formula $C_{39}H_{40}O_8N_4$, and the probable structural formula:—

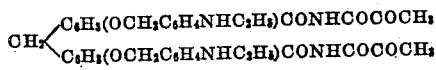

This new and useful organic compound is insoluble in cold water but soluble in alcohol. It is useful as an antiseptic, antineuralgic, antiarthritic and antirheumatic, and may be administered in doses of 90 to 180 grains per day.

Having thus described my invention, I claim:

The hereindescribed condensation product of a di (ethyl-aminobenzyl) ether of methylene-disalicyl amide with pyruvic acid, typified by the formula

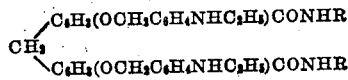

wherein R may represent the pyruvyl group or hydrogen, but having at least one R as a pyruvyl group; insoluble in water but soluble in alcohol.

In testimony whereof, I have hereunto signed my name at Ambler, Penna., this 9th day of October, 1928.

SAMUEL LEWIS SUMMERS.